US010454410B2

(12) United States Patent
Stoger et al.

(10) Patent No.: US 10,454,410 B2
(45) Date of Patent: *Oct. 22, 2019

(54) PIVOT AND FANNING DRIVE FOR SOLAR PANELS

(71) Applicant: SFS Acquisition, LLC, Boston, MA (US)

(72) Inventors: Elmar Stoger, Bad Erlach (AT); Alexander Swatek, Güssing (AT); Gerald Zach, Vienna (AT)

(73) Assignee: SFS Acquisition, LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/274,633

(22) Filed: Feb. 13, 2019

(65) Prior Publication Data
US 2019/0181798 A1 Jun. 13, 2019

Related U.S. Application Data

(63) Continuation of application No. 15/764,365, filed as application No. PCT/AT2016/060067 on Sep. 20, 2016, now Pat. No. 10,298,173.

(30) Foreign Application Priority Data

Oct. 2, 2015 (AT) .............................. A 50840/2015

(51) Int. Cl.
*H02S 30/20* (2014.01)
*H02S 20/30* (2014.01)
(Continued)

(52) U.S. Cl.
CPC ............. *H02S 30/20* (2014.12); *F16M 13/02* (2013.01); *F24S 20/50* (2018.05); *F24S 30/48* (2018.05); *H02S 20/30* (2014.12); *Y02E 10/47* (2013.01)

(58) Field of Classification Search
None
See application file for complete search history.

(56) References Cited

U.S. PATENT DOCUMENTS 4,552,438 A * 11/1985 Murphy ................. G02B 7/183
                                                   359/847
4,574,659 A   3/1986 Arndt
(Continued)

FOREIGN PATENT DOCUMENTS

AT          509886 A4    12/2011
AT          513875 B1     1/2014
(Continued)

OTHER PUBLICATIONS

International Search Report and Written Opinion for International Application No. PCT/AT2016/060067, dated Jan. 30, 2017.
(Continued)

*Primary Examiner* — Monica E Millner
(74) *Attorney, Agent, or Firm* — Wolf, Greenfield & Sacks, P.C.

(57) ABSTRACT

A swivel and fanning drive for solar panels, including a base support, a swivel plate mounted pivotingly about a horizontal axis, and a plurality of solar panels that can be fanned in and out about a fan-out axis. The swivel plate can be pivoted by at least one crank and connecting rod. Pivotal movement of the swivel plate about a vertical axis can cause the solar panels to be fanned-in or fanned-out. A brake can resist movement of the solar panels about the fan-out axis.

52 Claims, 5 Drawing Sheets

(51) Int. Cl.
*F24S 30/48* (2018.01)
*F24S 20/50* (2018.01)
*F16M 13/02* (2006.01)

(56) References Cited

U.S. PATENT DOCUMENTS

| | | | |
|---|---|---|---|
| 5,517,204 A | 5/1996 | Murakoshi et al. | |
| 7,026,541 B2* | 4/2006 | Heidrich | H02S 30/20 136/244 |
| 7,878,192 B2* | 2/2011 | Larsen | F24S 40/20 126/696 |
| 8,168,931 B1* | 5/2012 | Thel | F24S 30/452 250/203.4 |
| 8,176,806 B2 | 5/2012 | Boeing | |
| 8,381,718 B1 | 2/2013 | Luconi | |
| 8,664,511 B2 | 3/2014 | Swatek | |
| 9,214,892 B2 | 12/2015 | White | |
| 10,298,173 B2* | 5/2019 | Stoger | H02S 30/20 |
| 2009/0126775 A1* | 5/2009 | White | H02S 30/20 136/245 |
| 2009/0293933 A1* | 12/2009 | Clark | F24S 30/422 136/245 |
| 2010/0229678 A1* | 9/2010 | Boeing | F24S 30/452 74/665 L |
| 2011/0179791 A1* | 7/2011 | Butler | F24S 20/50 60/641.15 |
| 2011/0277748 A1* | 11/2011 | Chu | H02S 30/20 126/627 |
| 2011/0315192 A1* | 12/2011 | Swatek | H02S 30/20 136/245 |
| 2012/0285506 A1* | 11/2012 | Kuo | H02S 20/00 136/246 |
| 2013/0192659 A1 | 8/2013 | Upton et al. | |
| 2015/0059825 A1* | 3/2015 | Swatek | F24S 30/422 136/245 |
| 2015/0365047 A1* | 12/2015 | Swatek | H02S 30/20 136/245 |
| 2018/0294769 A1 | 10/2018 | Stoger et al. | |

FOREIGN PATENT DOCUMENTS

| | | |
|---|---|---|
| AT | 512680 B1 | 5/2014 |
| CL | 56988 B | 1/2019 |
| CN | 102959732 A | 3/2013 |
| CN | 103026145 A | 4/2013 |
| CN | 104539230 A | 4/2015 |
| DE | 3131612 A1 | 2/1983 |
| ES | 473356 A1 | 11/1979 |
| FR | 3 011 149 A1 | 3/2015 |
| GB | 2 469 344 A | 10/2010 |
| KR | 2009-0037100 A | 4/2009 |
| KR | 2011-0112047 A | 10/2011 |
| WO | WO 2007/134752 A1 | 11/2007 |
| WO | WO 2011/134004 A1 | 11/2011 |
| WO | WO 2012/073705 A1 | 6/2012 |
| WO | WO 2013/024369 A1 | 2/2013 |
| WO | WO 2013/115832 A2 | 8/2013 |
| WO | WO 2014/081160 A1 | 5/2014 |

OTHER PUBLICATIONS

International Preliminary Report on Patentability for PCT/AT2016/060067 dated Oct. 5, 2017.
Office Action for Austrian Application No. A 50840/2015 dated Oct. 2, 2015.

* cited by examiner

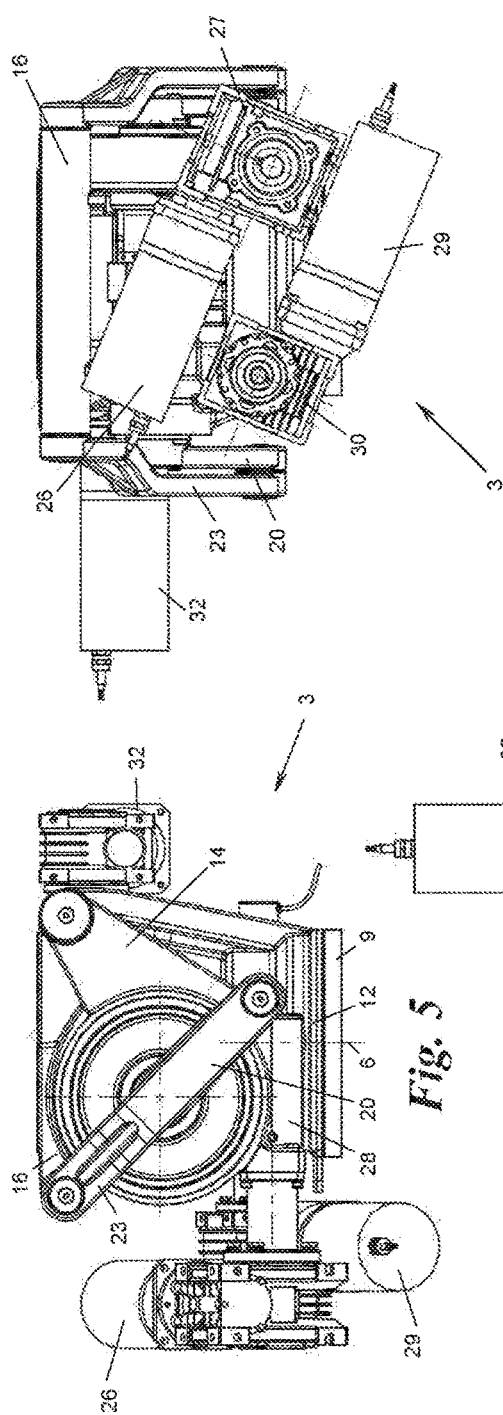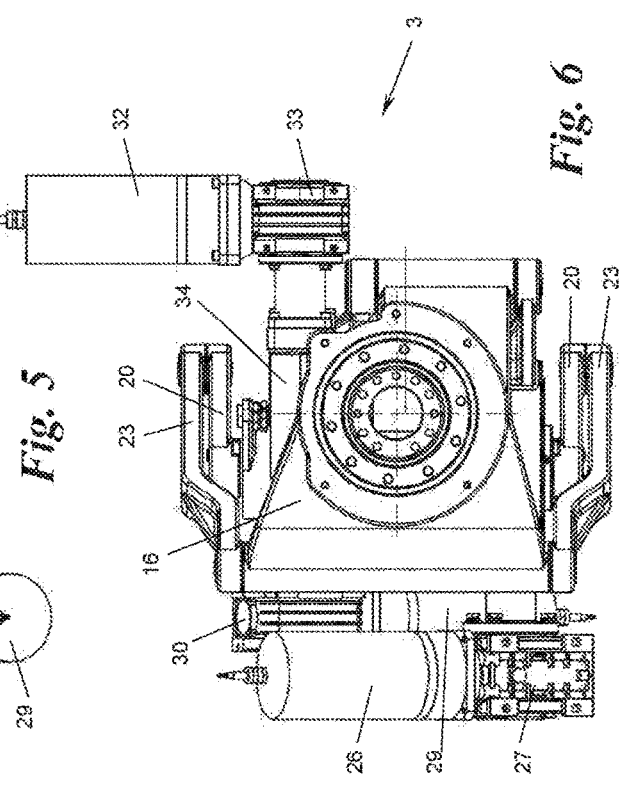

PIVOT AND FANNING DRIVE FOR SOLAR PANELS

RELATED APPLICATIONS

The present application is a continuation of U.S. application Ser. No. 15/764,365, filed Mar. 29, 2018, entitled "PIVOT AND FANNING DRIVE FOR SOLAR PANELS", which is a national stage filing under 35 U.S.C. 371 of International Patent Application Serial No. PCT/AT2016/060067, filed Sep. 20, 2016, entitled "SWIVEL AND FANNING DRIVE FOR SOLAR PANELS". Foreign priority benefits are claimed under 35 U.S.C. § 119(a)-(d) or 35 U.S.C. § 365(b) of Austrian application number A 50840/2015, filed Oct. 2, 2015. The entire contents of these applications are incorporated herein by reference in their entirety.

The present invention relates to a pivot and fanning drive for solar panels, having a base support, a rotary table, which is mounted on the base support pivotingly about a substantially vertical first axis, a swivel plate, which is mounted on the rotary table pivotingly about a substantially horizontal second axis, and a fanning shaft, which is mounted on the swivel plate pivotingly about a third axis and on which the solar panels can be mounted so as to be able to be fanned in and out about said third axis.

Solar panels that can be fanned out by means of a drive of this kind and that can be adjusted in accordance with the position of the sun are known for example from AT 509.886 B1, AT 512.680 B1 and AT 513.875 B1 by the same applicant. The solar panels there, by rotating the fanning shaft, on which the solar panels are mounted, can be fanned out from a protected position, in which they are stacked one above the other substantially congruently, into a fanned-out operating position, and vice versa. To this end, the uppermost (or lowermost) solar panel in the stack is connected to the fanning shaft non-rotatably, whereas the rest of the solar panels are arranged rotatably on the fanning shaft, and, by means of dogs, entrains the next solar panel—which in turn entrains the next solar panel, and so on—during the fanning out and fanning in operations. In the fanned-out operating position, the solar panels can be aligned with the sun by pivoting the rotary table and the swivel plate in the azimuth and elevation angles.

The objective of the invention is to create a pivot and fanning drive for solar panels of this kind which is of simpler construction, takes up less space, and is less susceptible to faults than the known designs.

This objective is achieved with a pivot and fanning drive of the kind described in the introduction, which in accordance with the invention is characterised in that the rotary table mounts one end of the swivel plate about the aforesaid second axis and, at a distance therefrom, mounts at least one crank, which is coupled by means of a connecting rod to the other end of the swivel plate in order to form a crank-rocker linkage.

The construction of a crank-rocker linkage from rotary table, swivel plate, crank and connecting rod leads to a very compact, space-saving design, in which the swivel plate can be swiveled into a rest position, for example for protection purposes, in which it can lie substantially parallel to and above the rotary table. For transport purposes, the swivel plate can be swiveled out into an approximately vertical end position, in which the crank and connecting rod are preferably substantially extended. Forces, for example resulting from impacts on the fanning head, thus act on the axis bearings and not on linkage parts at the crank axis, which are more sensitive. At the same time, this only requires very few parts, specifically crank and connecting rod, in order to construct the pivot gear for the swivel plate, thus simplifying manufacture. The use of a crank-rocker linkage for the swivel plate also leads to operation that is extremely unsusceptible to faults, since the crank remains fully capable of rotation and therefore an accidental overspeed of a motor driving the crank cannot in any way cause the motor or mechanism to become blocked or damaged.

The mounting axis of the crank lies preferably lower on the rotary table than the second axis, which, with suitable dimensioning of the crank, connecting rod, and effective link distances from the rotary table and swivel plate, can be used to pivot the swivel plate for example from a horizontal rest position, through arbitrary inclined positions, to an upright end position, so that it can follow the position of the sun.

A particularly robust and space-saving embodiment is provided when, in accordance with a preferred feature of the invention, the rotary table has two upwardly protruding bearing arms, between which the aforesaid one end of the swivel plate is mounted. For the same reasons, two cranks can preferably each be provided with one connecting rod, between which connecting rods the aforesaid other end of the swivel plate is mounted.

In an advantageous embodiment, the cranks can sit on a common shaft, which is mounted in bearing tabs of the rotary table, so that only one drive is necessary for both cranks. Here, the rotary table in particular—with bearing arms and bearing tabs, if provided—can be manufactured in one piece, preferably as a casting, which significantly simplifies the final assembly of the drive at the time of manufacture.

The pivot and fanning drive of the invention can be manually actuated. However, it is preferably designed for motor operation, more specifically both for fully automatic adjustment of the solar panels to the position of the sun and for fully automated fanning in and out of the solar panels, for example in order to bring them into a protected fanned-in position at night or in wind and rain.

The pivot movements about the aforesaid three axes can be implemented for this purpose by means of any drives known in the art, for example hydraulic or pneumatic drives or electric servomotors, for example slowly rotating or gear-reduced electric motors or stepper motors. Here, any gear mechanisms known in the art, for example planetary gear trains, and angular gears, for example planetary angle gears, can be used as gear mechanisms.

In preferred embodiments of the invention electric motors with reducing worm gears are used, i.e. the crank/s is/are preferably driven via a first worm gear by a first electric motor mounted on the rotary table; and/or the rotary table is driven via a second worm gear by a second electric motor mounted on the base support; and/or the fanning shaft is driven via a third worm gear by a third electric motor mounted on the swivel plate.

In accordance with a further aspect of the invention, instead of providing a dedicated third drive for the fanning shaft, one of the two other drives is used additionally for this purpose: By elective coupling of the fanning shaft to the rotary table or drive thereof or to the swivel plate or drive thereof, the solar panels can be made to fan out and in during the azimuth rotation of the rotary table or elevation pivoting of the swivel plate. After the desired fanning out or in of the solar panels, the coupling is released again, and the drives of the rotary table and of the swivel plate can be used again exclusively for the azimuth and elevation adjustment.

It is particularly favourable if the rotary table drive is co-used for the drive of the fanning shaft, i.e. the fanning shaft can be driven via a coupling by the rotary table or drive thereof and at the same time the coupling is automatically actuated by the pivoting of the swivel plate. In particular, the coupling can thus be closed in a rest position of the swivel plate and opened in a swivel position, deviating from the rest position, of the swivel plate. For example, the rest position of the swivel plate is the horizontal position thereof, lying parallel above and congruently relative to the rotary table, in which position the coupling closes. The rotary table drive can now be used to fan out the solar panels, whereupon these solar panels are aligned with the sun in terms of their elevation by means of the swivel drive, which releases the coupling and makes the rotary table drive usable again exclusively for azimuth adjustment.

An advantageous practical embodiment of the invention is characterised in that the coupling is formed by a pinion, driven by the rotary table via a gear shaft, and by a gear rim sitting on the fanning shaft, which gear rim engages with the pinion as the swivel plate is pivoted into the rest position, and becomes disengaged as the swivel plate is pivoted out of the rest position. This results in an automatic engagement and disengagement of the coupling between rotary table drive and fanning shaft as the swivel plate is pivoted.

In order to prevent the fanning shaft from rotating accidentally during operation once the aforesaid coupling has been released for separation of the azimuth and elevation drives, the fanning shaft, in accordance with a further preferred feature of the invention, can be selectively rotationally fixed relative to the swivel plate via a further coupling. This further coupling can also be actuated automatically with the swivel movement of the swivel plate, more specifically in particular the further coupling is opened in the rest position of the swivel plate and is closed in a swivel position of the swivel plate deviating from the rest position. In a preferred embodiment of this variant the further coupling for this purpose can be a brake disc that is rotationally fixed with the fanning shaft and is spring-loaded against a brake surface of the swivel plate and can be distanced from the brake surface by an actuation member of the rotary table as the swivel plate is pivoted into the rest position, thus enabling automatic actuation of the second coupling in a manner unsusceptible to faults. This can alternatively also be implemented in that the further coupling is a spring-loaded brake pinion, which is rotationally fixed but axially movable on the swivel plate and which has brake teeth for engaging with the gear rim and, as the swivel plate is pivoted into the rest position, is pressed against the spring loading into disengagement.

The invention will be explained in greater detail hereinafter with reference to exemplary embodiments shown in the accompanying drawings, in which FIGS. 1 and 2 show a solar module, with solar panels that can be fanned out, in two different operating positions, in each case in a schematic perspective view obliquely from above;

FIGS. 5 to 7 show the pivot and fanning drive of FIGS. 3 and 4 in a side view (FIG. 5), a plan view (FIG. 6) and a rear view (FIG. 7)

Figure 1:
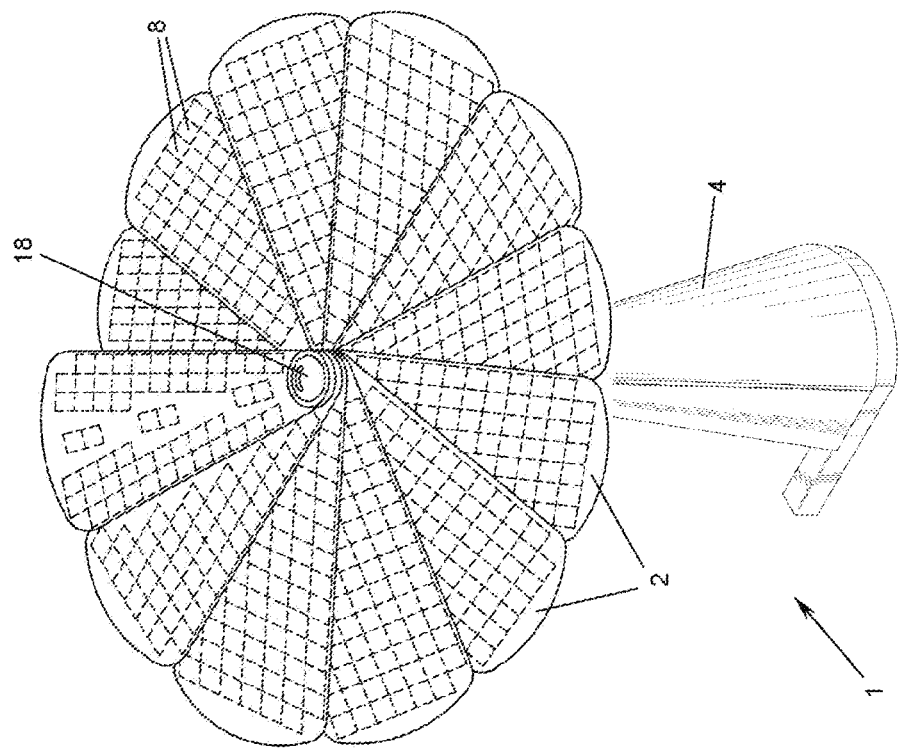
Figure 2:
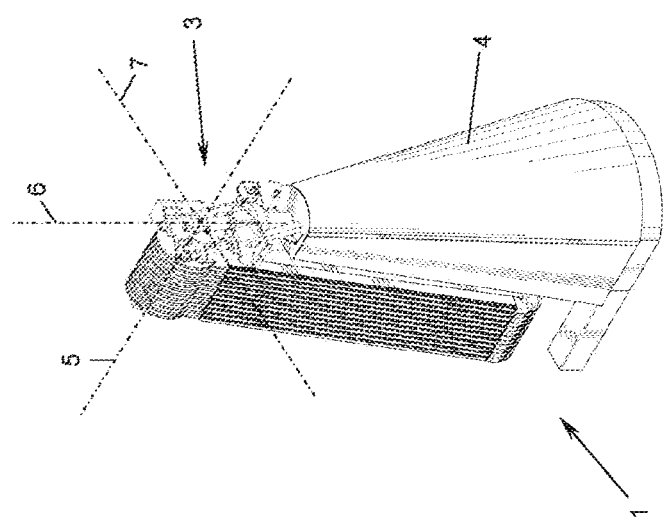
Figure 4:
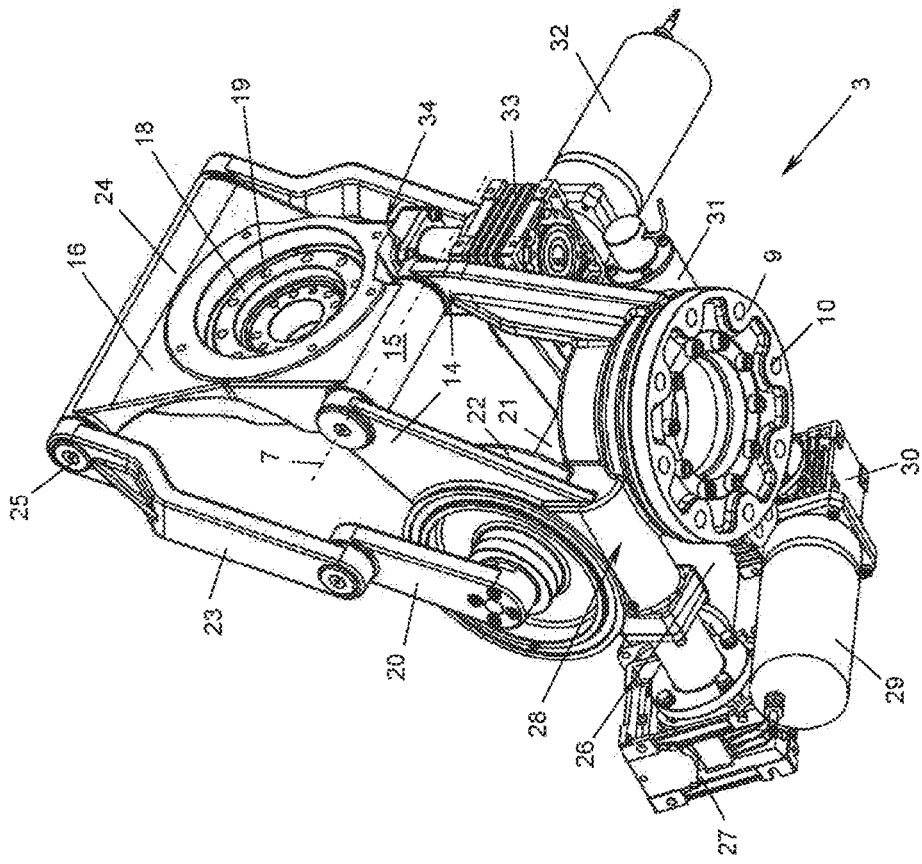
FIGS. 3 and 4 show a pivot and fanning drive according to the invention for the solar module of FIGS. 1 and 2 in two different operating positions, more specifically in a perspective view obliquely from above (FIG. 3) and in a perspective view obliquely from below (FIG. 4)
Figure 3:
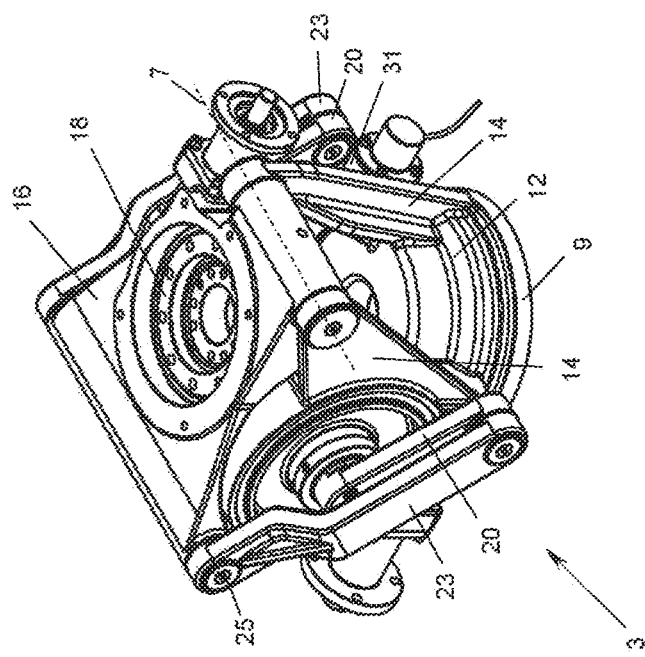
Figure 9:
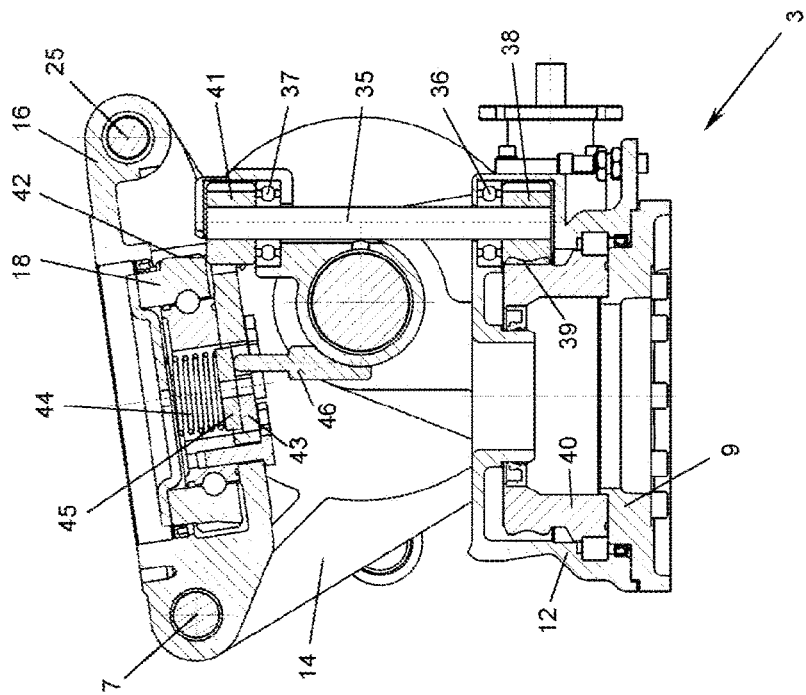
FIGS. 8 to 11 show two variants of an alternative embodiment of the pivot and fanning drive of FIGS. 3 to 7 in each case in two different operating positions in section.

FIGS. 1 and 2 show a solar module 1 having a multiplicity of lamella-like solar panels 2, which are mounted on an anchoring 4 such that they can be swiveled and fanned out by means of a pivot and fanning drive 3. The solar panels 2 can thus be fanned out from a first fanned-in position shown in FIG. 1, in which they are arranged substantially congruently one above the other in a stack, into a second fanned-out position shown in FIG. 2, in which they are fanned out about a common fan-out axis 5 and are thus brought into a position in which they are arranged substantially adjacently, and vice versa. Here, with the aid of the pivot and fanning drive 3, the fan-out axis 5 can be adjusted about a first, substantially vertical axis 6 in azimuth and about a second, substantially horizontal axis 7 in elevation, in order to align the fanned-out solar panels 2 with the sun and track it. The anchoring 4 can be of any kind, for example a pillar or stand as shown, but also a building part, a floor anchoring, part of a ship, a vehicle, a container, or the like.

The solar panels 2 for example have the form of a segment of a circle, preferably with rounded corners ("petal shape") as shown, and preferably supplement one another in their fanned-out position (FIG. 2)—although not necessarily—to form a complete circle. For example, twelve solar panels 2 are provided, the circle segment angle being approximately 30° in each case, wherein the fan-out or pivot angle of a solar panel 2 relative to its adjacent solar panel 2 is accordingly approximately 30°.

Each solar panel 2 has, on its upper side, a planar array of photovoltaic cells 8, for example in crystalline or organic form or produced using thin-film technology. The electrical connections and circuitry of the solar panels 2 and solar cells 8 are not shown, for the purpose of clarity; for example, the solar panels 2 are contacted via flexible connection cables or loop contacts and rigid contact rings on the anchoring 4 or the pivot and fanning drive 3 and are connected to the further power transmission electrics.

FIGS. 3 to 9 show the pivot and fanning drive 3 for the solar panels 2 in detail. The pivot and fanning drive 3 comprises a base support 9, here in the form of a ring flange, which for example can be screwed by means of bores 10 onto the upper end of the anchoring 4. A rotary table 12 is mounted on the base support 9 via a ball bearing 11 such that said rotary table at least can be pivoted, preferably can be fully rotated, about the axis 6.

The rotary table 12 has at one end 13 thereof two bearing arms 14, which protrude upwardly and are distanced from one another and between which one end 15 of a swivel plate 16 is mounted pivotingly about the axis 7. The swivel plate 16 could also be mounted in another way on the rotary table 12 so as to be able to pivot, for example could be mounted with the aid of a hinge. It should be noted that the terms "rotary table" and "swivel plate" do not relate literally to a table or plate form, but instead relate to the function of the particular component, i.e. the rotary table 12 could also have a form other than the form of a table, for example could have the form of a hub, a shaft connection piece, a block, etc.; and the swivel plate 16 could also have a form other than the form of a plate, for example the form of a hub, a connection piece, a block, or an arbitrarily shaped support.

A fanning shaft 18 is mounted on or in the swivel plate 16 via a ball bearing 17 such that said fanning shaft at least can be pivoted, preferably can be fully rotated, about the fan-out axis 5. Only the drive-side end of the fanning shaft 18 is shown in FIG. 3 to 9 (in the form of a ring flange), and the remaining part of the fanning shaft 18 (visible in FIG. 2) can be flange-mounted to said end part via bores 19 and carries the solar panels 2. By rotating the fanning shaft 18, the solar panels 2 can be brought from the fanned-in position (FIG. 1) into the fanned-out position (FIG. 2), and vice versa. To this end, the uppermost (or lowermost) solar panel 2 of the stack (FIG. 1) can for example be connected non-rotatably to the fanning shaft 18, and the lowermost (or uppermost) solar panel 2 can be connected non-rotatably to the swivel plate 16, wherein each of the solar panels 2 entrains the adjacent solar panel 2 by means of drag rails, drag hooks, dogs or the like during the fanning out or fanning in operations, until all solar panels 2 have been fanned out or in.

The sliding of the solar panels 2 one over the other during this dragging movement can be utilised in order to clean the solar panels 2. For this purpose, each solar panel 2 (with the exception of the lowermost solar panel 2) is provided on its rear side with a sweeper lip, which sweeps the corresponding solar panel 2 arranged beneath as the solar panels are fanned out. For example, the sweeper lip can be a rubber lip or a brush lip and at the same time can form the drag rail.

The swivel plate 16 is pivoted relative to the rotary table 12 with the aid of at least one (here: two) cranks 20, which sit on a common shaft 21, and which are mounted in bearing tabs 22 of the rotary table 12, more specifically such that the axis 21' of the shaft 21 lies parallel to, and at a distance from the pivot axis 7 of the swivel plate 16. The bearing tabs 22 can be formed by the foot regions of the bearing arms 14 or separately therefrom.

The cranks 20 are each coupled at their end remote from the shaft 21 by means of a connecting rod 23 to the other end 24, opposite the end 15, of the swivel plate 16 at a hinge axis 25.

The four parts constituted by the rotary table 12, swivel plate 16, cranks 20 and connecting rod 23 form a four-bar linkage, more specifically a crank-rocker linkage, the "crank" of which is formed by the cranks 20, the "rocker" of which is formed by the swivel plate 16, the "chassis" of which is formed by the rotary table 2, and the "coupling member" of which is formed by the connecting rod 23. The chassis length between shaft axis 21' and swivel axis 7, the rocker length between swivel axis 7 and hinge axis 25, and the effective length of the crank 20 and connecting rod 23 determine the kinematics of the crank-rocker linkage, as is known in the art. The aforesaid lengths are preferably—but not necessarily—selected so that the swivel plate 16 performs an approximately 90° pivoting movement from an approximately horizontal rest position (FIG. 3) into an approximately vertical end position (FIG. 4) and back when the cranks 20 perform a full rotation.

Here, the shaft axis 21' of the cranks 20 preferably lies offset to and beneath the swivel axis 7, so that in the rest position (FIG. 3) the swivel plate 16 lies approximately parallel to and above the rotary table 12, when the cranks 20 and connecting rod 23 are in their maximally shortened position. This results in a very small spatial requirement in the rest position (see FIG. 3). In the maximally swiveled-out end position of FIG. 4, the cranks 20 and connecting rod 23 are in their maximally extended position.

The movements of the pivot and fanning drive 3 about one or more of the axes 5, 6, 7 can be performed manually, in the simplest case. The movements about one or more of the axes 5, 6, 7, however, are preferably brought about by corresponding drives, for example hydraulic or pneumatic cylinders, servomotors, stepper motors, or the like. A first embodiment is shown in FIG. 3 to 7, in which a gear-reduced electric drive is provided for each of the three movements.

To this end, a first electric motor 26 with flange-mounted angular gear 27 is mounted on the rotary table 12 and drives one of the cranks 20 or shaft 21 thereof by means of a first worm gear 28. The first worm gear 28 for example comprises a worm driven by the electric motor 26 by means of the angular gear 27, which worm engages in a worm wheel sitting on one crank 20 or the shaft 21.

A second electric motor 29 with flange-mounted angular gear 30 is mounted on the base support 9 and drives the rotary table 12 by means of a second worm gear 31, which for example comprises a worm engaging in a worm wheel of the rotary table 12.

A third electric motor 32 with flange-mounted angular gear 33 is mounted on the swivel plate 16 and drives the fanning shaft 18 by means of a third worm gear 34, for example again with the aid of a worm engaging in a worm wheel connected to the fanning shaft 18.

It shall be understood that instead of one or more of the worm gears, other suitable gear mechanisms, for example spur gears, planetary gear trains or angular gears, such as bevel gears, crown gears or planetary angle gears, more specifically in each case with one or more gear stages, can also be used.

Figure 8:
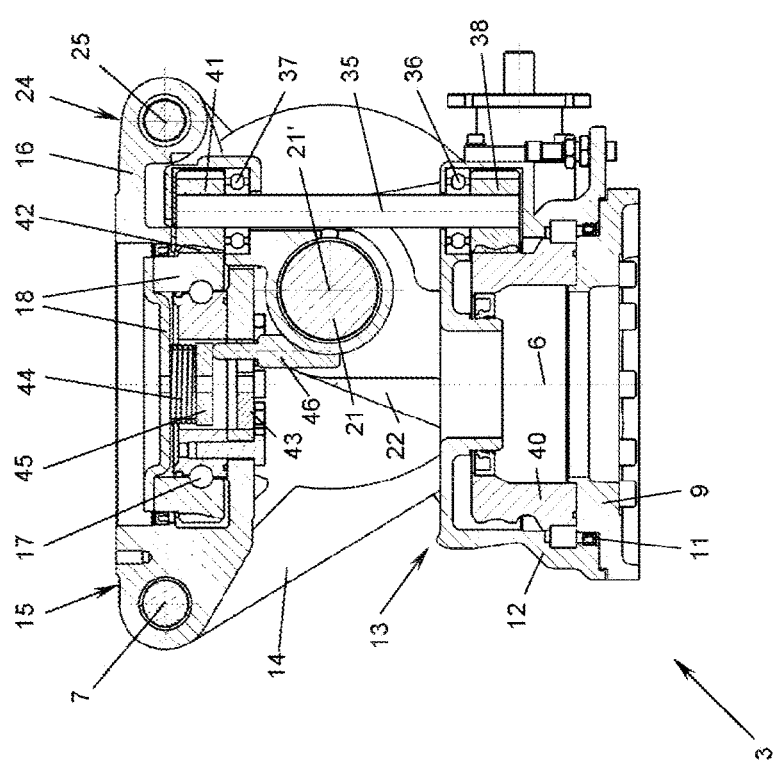
Figure 11:
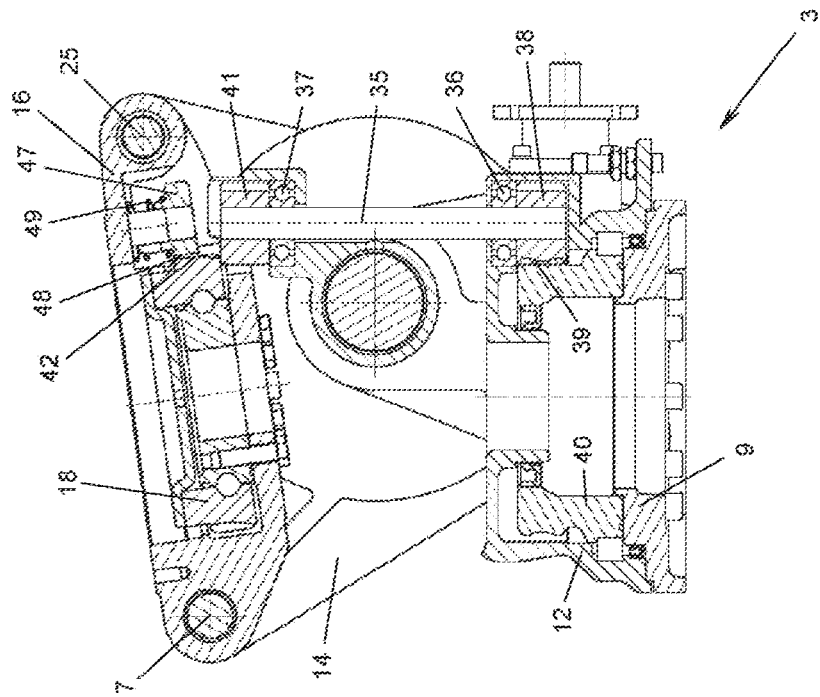

FIGS. 8 and 11 show variants of a second embodiment for the drive of the fanning shaft 18, wherein more specifically there is no independent electric drive provided for this, and instead the drive of the rotary table 12 is co-used electively for this purpose. To this end, a gear shaft 35 with approximately vertical rotation axis is mounted in bearings 36, 37 on the rotary table 12 and/or one of the bearing tabs 22 thereof. The gear shaft 35 has, at its lower end, a pinion 38, which engages with a gear rim 39, which is formed on the outer periphery of a flange 40 of the base support 9. As the rotary table 12 rotates relative to the base support 9 or flange 40 thereof, the gear shaft 35 is thus set in rotation.

At its upper end, the gear shaft 35 carries a further pinion 41, which in the pivoted-down position of the swivel plate 16 (FIGS. 8 and 10) engages with a gear rim 42, which is formed on the outer periphery of the fanning shaft 18. In this position the second electric motor 29 thus drives both the rotary table 12 and—via the engagement of pinion 41 and gear rim 42—the fanning shaft 18, so that the solar panels 2 are fanned out or in about the axis 5 at the same time as the rotation about the axis 6 happens.

Figure 10:
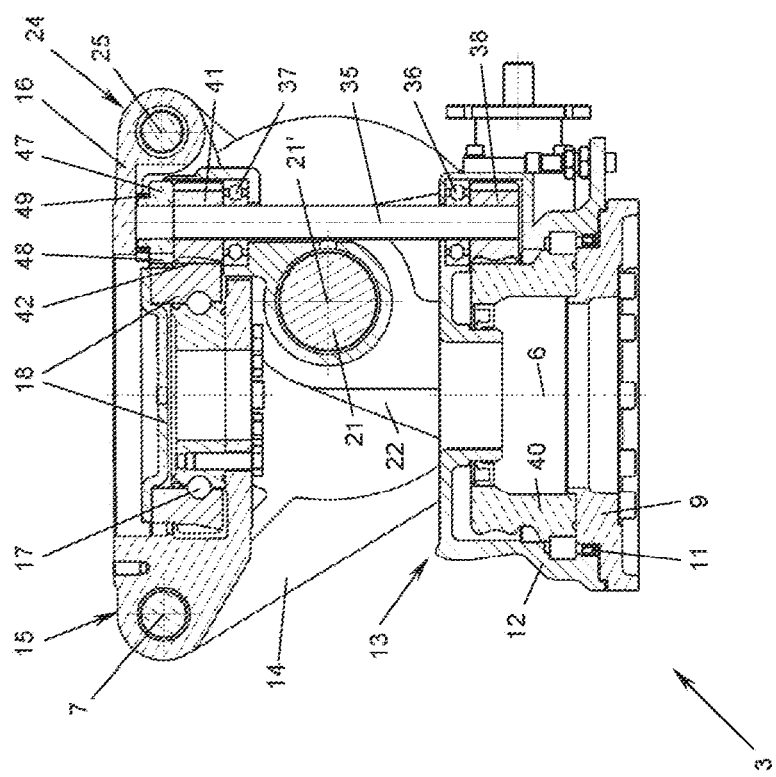

The pinion 41 and the gear rim 42 thus form a coupling between the rotary table 12 or drive thereof and the fanning shaft 18, which is closed in the rest position of the swivel plate 16 shown in FIGS. 8 and 10. As the swivel plate 16 is pivoted up, the coupling opens (see FIGS. 9 and 11), i.e. the pinion 41 and gear rim 42 are disengaged, so that the electric motor 29 can now be used again exclusively for the rotary drive about the axis 6, i.e. the azimuth adjustment of the solar panels 2.

As the swivel plate 16 is pivoted down or in, respectively, into the rest position (FIGS. 8 and 10), the coupling 41, 42 is closed again, and the electric motor 29 can then be used again additionally to, e.g., fan in the solar panels 2.

If desired, the stacked solar panels 2 can be pivoted down in the fanned-in position by being rotated about the swivel axis 7, such that they assume the position hanging down as shown in FIG. 1, in which they are protected against wind and weather.

It shall be understood that, instead of the second electric motor 29 of the rotary table drive, also the first electric motor 26 for the swivel plate drive can be co-used for the elective driving of the fanning shaft 18, in which case a similar coupling is provided between the swivel plate 16 or drive 26 thereof and the fanning shaft 18.

When the coupling 41, 42 of the fanning shaft 18 is released in a position deviating from the rest position (FIGS. 8 and 10), a further coupling can be used to temporarily rotationally fix the fanning shaft 18 relative to the swivel plate 16 so that an accidental change to the fanned-in or fanned-out position of the solar panels 2 is avoided, in particular during the azimuth and elevation adjustment thereof. The further coupling in the variant of FIGS. 8 and 9 comprises a brake disc 45 connected non-rotatably to the fanning shaft 18 and spring-loaded against a brake surface 43 of the swivel plate 16 by means of a spring 44. As the swivel plate 16 is pivoted down into the rest position, the brake disc 45 is distanced from the brake surface 43 by means of an actuation member 46 mounted on the rotary table 12, see FIG. 8. As the swivel plate 16 is pivoted up, the actuation member 46 becomes disengaged from the brake disc 45, such that the brake disc is pressed by the spring 44 against the brake surface 43 and thus rotationally fixes the fanning shaft 18 relative to the swivel plate 16. The further coupling 43-46 is thus opened in the rest position of the swivel plate 16 and is closed in a swivel position of the swivel plate 16 deviating therefrom.

Instead of the shown brake disc/brake surface design of the coupling 43-46, any other kind of coupling which enables the shown temporary fixing of the fanning shaft 18 can also be used.

For example, in accordance with the variant shown in FIGS. 10 and 11, the brake function of the further coupling can be attained alternatively by a brake pinion 47 or the like with brake teeth 48, which in the position of FIG. 10 is mounted for example in line with the gear shaft 35 on the swivel plate 16 non-rotatably, but axially movably, i.e. movably vertically in the depiction of FIG. 10, spring-loaded downwardly by means of a spring 49. As the swivel plate 16 pivots up (FIG. 11), this brake pinion 47 is pressed in a spring-loaded manner with its brake teeth 48 into engagement with the gear rim 42, to rotationally fix the gear rim. In the rest position of the swivel plate 16 (FIG. 10), the brake pinion is slid out of engagement from the gear shaft 35 against its spring loading, and thus releases the gear rim 42.

It shall be understood that the couplings 41, 42 and 43-49 could also be actuated manually or by means of electric actuating members, which for example can be controlled by an electronics unit also controlling the electric motors 26 and 29 accordingly.

The invention is not limited to the presented embodiments, but encompasses all variants, modifications, and combinations thereof that fall within the scope of the appended claims.

The invention claimed is:

1. A support arrangement for solar panels, comprising:
a base support,
a swivel plate mounted to pivot relative to the base support about a horizontal axis,
a plurality of solar panels mounted on the swivel plate for pivotal movement relative to the swivel plate about a fan-out axis,
at least one crank mounted to pivot relative to the base support, and
a connecting rod coupled between the at least one crank and the swivel plate such that pivotal movement of the at least one crank pivots the swivel plate about the horizontal axis.

2. The support arrangement of claim 1, wherein the swivel plate is mounted at a first end to pivot about the horizontal axis, and the connecting rod is coupled to a second end of the swivel plate, the second end of the swivel plate being opposite the first end of the swivel plate.

3. The support arrangement of claim 1, wherein the swivel plate is movable about the horizontal axis between a horizontal position and a vertical position.

4. The support arrangement of claim 1, comprising first and second cranks that are mounted to a common shaft arranged to pivot relative to the base support, and first and second connecting rods that are respectively coupled between the first and second cranks and the swivel plate.

5. The support arrangement of claim 1, further comprising a rotary table mounted to the base support for pivotal movement about a vertical axis relative to the base support, wherein the at least one crank is pivotally mounted to the rotary table, and the swivel plate is pivotally mounted to the rotary table.

6. The support arrangement of claim 1, further comprising a fanning shaft mounted to the swivel plate to pivot about the fan-out axis relative to the swivel plate, wherein the plurality of solar panels are mounted to the fanning shaft such that at least one of the plurality of solar panels is movable with the fanning shaft.

7. The support arrangement of claim 6, further comprising a rotary table mounted to the base support for pivotal movement about a vertical axis relative to the base support, wherein the at least one crank is pivotally mounted to the rotary table, and the swivel plate is pivotally mounted to the rotary table, and a coupling is arranged between the fanning shaft and the rotary table such that movement of the rotary table pivots the fanning shaft about the fan-out axis.

8. The support arrangement of claim 7, wherein movement of the swivel plate about the horizontal axis engages and disengages the coupling between the fanning shaft and the rotary table.

9. The support arrangement of claim 6, further comprising a brake arranged to resist movement of the fanning shaft about the fan-out axis.

10. The support arrangement of claim 9, wherein the brake is engaged and disengaged based on movement of the swivel plate about the horizontal axis.

11. The support arrangement of claim 10, wherein the brake is disengaged with the swivel plate in a horizontal position, and is engaged to resist movement of the fanning shaft with the swivel plate positioned away from the horizontal position.

12. The support arrangement of claim 1, wherein the at least one crank is arranged to pivot about a mounting axis which is located below the horizontal axis.

13. A support arrangement for solar panels, comprising:
a base support,
a rotary table mounted on the base support for pivotal movement about a vertical axis,
a swivel plate mounted to pivot relative to the base support about a horizontal axis,
a plurality of solar panels mounted on the swivel plate for pivotal movement relative to the swivel plate about a fan-out axis between fanned out and fanned in positions, and
a single motor drive arranged to both move the rotary table about the vertical axis and move the plurality of solar panels about the fan-out axis.

14. The support arrangement of claim 13, further comprising:
at least one crank mounted to pivot relative to the rotary table, and a connecting rod coupled between the at least one crank and the swivel plate such that pivotal movement of the at least one crank pivots the swivel plate about the horizontal axis.

15. The support arrangement of claim 14, wherein the at least one crank is pivotally mounted to the rotary table, and the swivel plate is pivotally mounted to the rotary table.

16. The support arrangement of claim 13, wherein the swivel plate is mounted at a first end to pivot about the horizontal axis, and the connecting rod is coupled to a second end of the swivel plate, the second end of the swivel plate being opposite the first end of the swivel plate.

17. The support arrangement of claim 13, wherein the swivel plate is movable about the horizontal axis between a horizontal position and a vertical position.

18. The support arrangement of claim 13, further comprising a coupling arranged between the plurality of solar panels and the rotary table such that movement of the rotary table about the vertical axis pivots at least one solar panel about the fan-out axis.

19. The support arrangement of claim 18, wherein movement of the swivel plate about the horizontal axis engages and disengages the coupling between the plurality of solar panels and the rotary table.

20. The support arrangement of claim 13, wherein the single motor drive is arranged to move the rotary table about the vertical axis, and a coupling between the rotary table and the plurality of solar panels drives at least one solar panel to pivot about the fan-out axis with movement of the rotary table about the vertical axis.

21. The support arrangement of claim 20, further comprising a fanning shaft mounted to the swivel plate to pivot about the fan-out axis relative to the swivel plate, wherein the plurality of solar panels are mounted to the fanning shaft such that at least one of the plurality of solar panels is movable with the fanning shaft.

22. The support arrangement of claim 21, wherein the coupling is arranged between the fanning shaft and the rotary table such that movement of the rotary table pivots the fanning shaft about the fan-out axis.

23. The support arrangement of claim 22, wherein movement of the swivel plate about the horizontal axis engages and disengages the coupling between the fanning shaft and the rotary table.

24. The support arrangement of claim 13, further comprising a brake arranged to resist movement of the plurality of solar panels about the fan-out axis.

25. The support arrangement of claim 24, wherein the brake is engaged and disengaged based on movement of the swivel plate about the horizontal axis.

26. The support arrangement of claim 25, wherein the brake is disengaged with the swivel plate in a horizontal position, and is engaged to resist movement of the fanning shaft with the swivel plate positioned away from the horizontal position.

27. A support arrangement for solar panels, comprising:
a base support,
a swivel plate mounted to pivot relative to the base support about a horizontal axis,
a plurality of solar panels mounted on the swivel plate for pivotal movement relative to the swivel plate about a fan-out axis between fanned out and fanned in positions, and
a coupling arranged to selectively couple at least one of the plurality of solar panels to a drive for movement of the at least one solar panel about the fan-out axis and decouple the at least one solar panel from the drive such that the drive is incapable of moving the at least one solar panel about the fan-out axis.

28. The support arrangement of claim 27, further comprising a rotary table mounted to the base support for pivotal movement about a vertical axis relative to the base support.

29. The support arrangement of claim 28, further comprising:
at least one crank mounted to pivot relative to the rotary table, and
a connecting rod coupled between the at least one crank and the swivel plate such that pivotal movement of the at least one crank pivots the swivel plate about the horizontal axis.

30. The support arrangement of claim 29, wherein the at least one crank is pivotally mounted to the rotary table, and the swivel plate is pivotally mounted to the rotary table.

31. The support arrangement of claim 30, wherein the swivel plate is mounted at a first end to pivot about the horizontal axis, and the connecting rod is coupled to a second end of the swivel plate, the second end of the swivel plate being opposite the first end of the swivel plate.

32. The support arrangement of claim 27, wherein the swivel plate is movable about the horizontal axis between a horizontal position and a vertical position.

33. The support arrangement of claim 27, wherein movement of the swivel plate about the horizontal axis engages and disengages the coupling between the at least one of the plurality of solar panels and the drive.

34. The support arrangement of claim 27, further comprising a rotary table mounted to the base support for pivotal movement about a vertical axis relative to the base support, wherein the drive is arranged to move the rotary table about the vertical axis, and the coupling is arranged to move at least one solar panel to pivot about the fan-out axis with movement of the rotary table about the vertical axis.

35. The support arrangement of claim 27, further comprising a fanning shaft mounted to the swivel plate to pivot about the fan-out axis relative to the swivel plate, wherein the plurality of solar panels are mounted to the fanning shaft such that at least one of the plurality of solar panels is movable with the fanning shaft.

36. The support arrangement of claim 35, further comprising a rotary table mounted to the base support for pivotal movement about a vertical axis relative to the base support, wherein the coupling is arranged between the fanning shaft and the rotary table such that movement of the rotary table pivots the fanning shaft about the fan-out axis.

37. The support arrangement of claim 36, wherein movement of the swivel plate about the horizontal axis engages and disengages the coupling between the fanning shaft and the rotary table.

38. The support arrangement of claim 27, further comprising a brake arranged to resist movement of the plurality of solar panels about the fan-out axis.

39. The support arrangement of claim 38, wherein the brake is engaged and disengaged based on movement of the swivel plate about the horizontal axis.

40. The support arrangement of claim 39, wherein the brake is disengaged with the swivel plate in a horizontal position, and is engaged to resist movement of the plurality of solar panels about the fan-out axis with the swivel plate positioned away from the horizontal position.

41. A support arrangement for solar panels, comprising:
a base support,
a swivel plate mounted to pivot relative to the base support about a horizontal axis, a plurality of solar panels mounted on the swivel plate for pivotal movement relative to the swivel plate about a fan-out axis between fanned out and fanned in positions, and a brake arranged to selectively resist movement of at least one of the plurality of solar panels about the fan-out axis.

42. The support arrangement of claim 41, further comprising a rotary table mounted to the base support for pivotal movement about a vertical axis relative to the base support.

43. The support arrangement of claim 42, further comprising:
at least one crank mounted to pivot relative to the rotary table, and
a connecting rod coupled between the at least one crank and the swivel plate such that pivotal movement of the at least one crank pivots the swivel plate about the horizontal axis.

44. The support arrangement of claim 43, wherein the at least one crank is pivotally mounted to the rotary table, and the swivel plate is pivotally mounted to the rotary table.

45. The support arrangement of claim 43, wherein the swivel plate is mounted at a first end to pivot about the horizontal axis, and the connecting rod is coupled to a second end of the swivel plate, the second end of the swivel plate being opposite the first end of the swivel plate.

46. The support arrangement of claim 41, wherein the swivel plate is movable about the horizontal axis between a horizontal position and a vertical position.

47. The support arrangement of claim 41, wherein movement of the swivel plate about the horizontal axis engages and disengages the brake to selectively resist movement of the at least one solar panel about the fan-out axis.

48. The support arrangement of claim 41, further comprising a fanning shaft mounted to the swivel plate to pivot about the fan-out axis relative to the swivel plate, wherein the plurality of solar panels are mounted to the fanning shaft such that at least one of the plurality of solar panels is movable with the fanning shaft.

49. The support arrangement of claim 48, further comprising a rotary table mounted to the base support for pivotal movement about a vertical axis relative to the base support, and a coupling arranged between the fanning shaft and the rotary table such that movement of the rotary table pivots the fanning shaft about the fan-out axis.

50. The support arrangement of claim 49, wherein movement of the swivel plate about the horizontal axis engages and disengages the coupling between the fanning shaft and the rotary table.

51. The support arrangement of claim 41, wherein the brake is engaged and disengaged based on movement of the swivel plate about the horizontal axis.

52. The support arrangement of claim 51, wherein the brake is disengaged with the swivel plate in a horizontal position, and is engaged to resist movement of the plurality of solar panels about the fan-out axis with the swivel plate positioned away from the horizontal position.

* * * * *